United States Patent [19]
Quadir

[11] Patent Number: 5,658,837
[45] Date of Patent: Aug. 19, 1997

[54] STABILIZED ZIRCONIA

[75] Inventor: Tariq Quadir, Simpsonville, S.C.

[73] Assignee: AlSiMag Technical Ceramics, Inc., Laurens, S.C.

[21] Appl. No.: 582,038

[22] Filed: Jan. 2, 1996

Related U.S. Application Data

[63] Continuation of Ser. No. 311,537, Sep. 23, 1994, abandoned.

[51] Int. Cl.$^6$ .................................................. C04B 35/48
[52] U.S. Cl. ................................................ 501/103; 501/152
[58] Field of Search ........................................ 501/103, 152

[56] References Cited

U.S. PATENT DOCUMENTS

| | | | |
|---|---|---|---|
| 4,360,598 | 11/1982 | Otagiri et al. | 501/103 |
| 4,525,464 | 6/1985 | Claussen | 501/103 |
| 4,659,680 | 4/1987 | Guile | 501/103 |
| 4,853,353 | 8/1989 | Whalen et al. | 501/103 |
| 4,891,343 | 1/1990 | Quadair | 501/103 |

FOREIGN PATENT DOCUMENTS

| | | | |
|---|---|---|---|
| 0005067 | 1/1985 | Japan | 501/103 |
| 0090871 | 5/1985 | Japan | 501/103 |
| 0141671 | 7/1985 | Japan | 501/103 |
| 0246261 | 12/1985 | Japan | 501/103 |

OTHER PUBLICATIONS

"Exhaust Gas Purifying Catalyst Excellent in Heat Resistance and its Preparation" Kayano et al. JP 04–284847 (Feb. 24, 1993).

"Manufacture of Solid Electrolyte for Fuel Cell", Okuyama JP 03–196465 (Nov. 21, 1991).

*Primary Examiner*—Paul Marcantoni
*Attorney, Agent, or Firm*—Hardaway Law Firm, P.A.

[57] ABSTRACT

The invention is directed to improved stabilized zirconia compositions and the processes for making the same. Low cost stabilizers, in the form of ceria/yttria or ceria/yttria/noedynium mixtures, are used to maintain zirconia in tetragonal form at room temperature without tending to convert back to monoclinic form at increased temperatures or while under stress.

10 Claims, No Drawings

STABILIZED ZIRCONIA

This application is a continuation, of application Ser. No. 08/311,537, filed Sep. 23,1994, now abandoned.

BACKGROUND OF THE INVENTION

1. Field of the Invention

This invention relates to ceramics, and more particularly to improving the properties of ceramic zirconia.

2. Description of the Previously Published Art

Because of its toughness, wear resistance, harness, low thermal conductivity, and other properties, zirconia ($ZrO_2$) has found numerous ceramic applications. Typical of these uses (e.g., in gasoline or diesel engines) are wear buttons for valve tappets; valve seats; oxygen sensor sleeves; piston caps (for diesels), and precombustion chamber elements (for diesels). Typical non-auto engine uses include grinding balls, dies, check valves and the like.

As described in my related patent, U.S. Pat. No. 4,891,343, of Jan. 2, 1990, tetragonal zirconia, the most commonly used form of zirconia, can exist at room temperature, but is meltable and under stress tends to transform to the monoclinic form, with increase in volume and loss of various important properties.

Various modifications and/or treatments of zirconia have been tried in efforts to minimize conversion of tetragonal to the monoclinic form. One approach is to add a stabilizer containing expensive dysprosia ($Dy_2O_3$) to the tetragonal zirconia.

OBJECTS OF THE INVENTION

It is an object of the invention to provide a stabilized tetragonal zirconia which is cost effective. Properties of this stabilized tetragonal zirconia include improved: flexural strength, low temperature stability; fracture toughness; hardness; improved resistance to thermal shock, abrasion and erosion; and others.

It is a further object to stabilize ceramic zirconia without the use of expensive stabilizers, such as dysprosia.

It is also an object to provide shaped zirconia ceramics of superior thermal and mechanical properties.

These and further objects of the invention are achived by addition of small amounts of various stabilizers to tetragonal zirconia. In one example, the stabilizer is a mixture of $Nd_2O_3$, $Y_2O_3$, and $CeO_2$. In another example, the stabilizer is a mixture of $Y_2O_3$ and $CeO_2$, without $Nd_2O_3$.

DESCRIPTION OF THE PREFERRED EMBODIMENTS

As recognized by one skilled in the art, the preferred starting particle size of $ZrO_2$ powder is a tradeoff between finer sizes for increased reactivity sintering and larger sizes for easier powder handling during processing. In the invention described herein, the $ZrO_2$ powder preferably used has an average particle size below about 20,000 Angstrom units since the smaller, more reactive particle size aids sintering. For zirconia particles sizes below 200 Angstrom units, the present stabilizer system may become somewhat less effective, since material this fine is fairly stable, as discussed in 69 Jour. Phys. Chem, 1238 (1965). It may be noted that zirconia at 200 Angstrom units, so far as is known, is not available commercially in non-agglomerated form. Thus, the zirconia average particle size of less than 20,000 Angstrom units or above 200 Angstrom units is a preferred material. In such commercial powders, the zirconia is in the monoclinic form, except for the finest particles, which may be in the tetragonal form. On sintering, the stabilizers diffuse into the zirconia and changes it to the tetragonal form.

In the invention described herein, yttria and ceria are the preferred stabilizers. Yttria and ceria sources include the preferred nitrates, as well as other soluble salts such as oxalates, acetates, chlorides, etc. The stabilizers can also be added simply as oxides, in which case the calcination step described below to decompose the salts can be omitted. Solvents for the stabilizers in salt form include the preferred, i.e., low cost water, as well as other solvents such as isopropyl alcohol, acetone, etc. When all the materials are in oxide form, their solubility becomes irrelevant, and the liquid simply becomes a dispersion medium.

The zirconia can be admixed with the stabilizers in any conventional high shear mixer to form a slurry. It is preferred to have the slurry mixture carry at least about 70 weight % solids loading. Substantially any of the conventional processes such as spray, tumble, or pay drying may be used for drying the zirconia/additive slurry.

When the stabilizers are added in salt form, calcining is used to decompose the salts. The calcining temperature may vary in the range of from about 800° to 900° C. for about one hour.

The $ZrO_2$ powder, which has either a calcined salt, dried oxide or a mixture of the two, is milled for a period of time sufficient to provide complete homogeneity. The milling time will also depend on the particle size desired in the product.

The dry powder can be pressed into greenware shapes for sintering, e.g., at pressures of 8,000–15,0000 p.s.i. as conventionally used.

Sintering is the final step, and this should be carried in a furnace with the product exposed to air, preferably at about 1530° C. for about one hour. Higher temperatures could be used, but the grain size would adversely increase.

In addition to the yttria/ceria stabilizer described above, the other stabilizer adds $Nd_2O_3$ to the yttria/ceria slurry. Any of these stabilizers are substantially cheaper to use than prior art stabilizers such as those described in my prior patent.

Table 1 below illustrates the ranges for the two types of stabilized $ZrO_2$ compositions according to the invention.

TABLE 1

Stabilized Zirconia Compositions

| | Mole Percent | |
|---|---|---|
| Ingredient | Type 1 Preferred Range | Type 2 Preferred Range |
| $ZrO_2$ | 89.15–93.5 | 88.4–92.50 |
| $CeO_2$ | 5.5–7.0 | 6.0–8.93 |
| $Y_2O_3$ | 1.0–1.5 | 1.0–2.0 |
| $Nd_2O_3$ | N/A | 0.3–1.3 |

Having described the basic aspects of the invention, the following examples are given to illustrate specific embodiments of stabilized zirconia compositions according to the invention.

EXAMPLE 1

This example describes the preparation of a stabilized zirconia composition according to the present invention.

The following ingredients were assembled:

$ZrO_2$=112.9 g., 92.01 mole percent, average particle size about 1.2. μm;

$Nd_2O_3$=1.15 g, 0.34 mole percent;

$Y_2O_3$=2.26 g, 1.0 mole percent (from Y $(NO_3)_3$); and $CeO_2$=11.4 g, 6.65 mole percent (from $Ce(NO_3)_4$).

The nitrates were mixed in 1000 ml water with stirring for about two hours until completely dissolved, at which time the $Nd_2O_3$ was added to form a slurry. The monoclinic zirconia powder (Z-Tech Corp. New Hampshire) was then added to the solution, and the slurry thoroughly mixed in a ½-liter plastic jar with ½ inch alumina balls. The slurry was then dried under a heat lamp to form a powder. The powder was calcined at 800°–900° C. for 1 hour, as described above, to decompose the nitrates to the oxide form. The calcined powder was milled a dry ball mill for ten (10) hours, and the processed powder was dry-pressed into a ceramic shape (0.24×0.15 inch cross section) and sintered in a furnace, in air, at 1530° C. for 2 hours.

EXAMPLES 2–4

Examples 2–4 were carried out by the same general procedure of Example 1 but using the ingredients set forth in Table 1 above. The precise amounts of the ingredients used are shown in Table 2.

RESULTS

The products from Examples 1–4 were analyzed using the conventional test procedures described below and the results are reported in Table 2.

1. Flexural strength: Four-point bend test. The specimens/bars were tested under the following conditions:

Spans: Inner=0.5". Outer=1.0".

Cross head speed: 0.02 in/min

Width of the bar (approx.)=0.1900 inches.

Thickness of the bar (approx.)=0.1300 inches.

Machine: Instron.

2. Low temperature stability: This test is performed in an autoclave maintained at 200° C. The water vapor pressure was 100 p.s.i. (this was generated by addition of approximately 3–4 ml of water at room temperature). The samples were held under the above conditions for 250 hours. The testing for degradation in strength was done using a dye penetrant and later tested for flexural strength.

3. Fracture toughness: This was measured using the indentation and the pre-notched beam technique. The experiments were done at 10–20 kg load.

4. Hardness: Vickers hardness was measured using 1 kg load.

5. Thermal shock: The theory of thermal shock evaluation is described by Hassellman in J. Amer. Ceram. Soc., Vol 52, No. 11 pages 600–604 (1969). Following Hassellman's technique the samples were heated to the desired temperature and equilibrated at that temperature for ten minutes before they were instantaneously quenched into the room temperature bath (at 25° C.) which was agitated vigorously when the sample was placed in the bath to maintain the bath at its constant temperature. The difference between the heated temperature and the room temperature quench is reported as the delta temperature in the thermal shock value in Table 2 through which the sample survived.

6. Thermal expansion: An Orton Dilatometer was used.

TABLE 2

Influence of Stabilizers on Zirconia Mole Percent

| Ingredient | Ex. 1 | Ex. 2 | Ex. 3 | Ex. 4 |
|---|---|---|---|---|
| $ZrO_2$ | 92.01 | 92.26[1] | 90.7 | 88.37 |
| $Y_2O_3$ | 1.0 | 1.1 | 2.0 | 1.80 |
| $CeO_2$ | 6.65 | 6.63 | 6.0 | 8.93 |
| $Nd_2O_3$ | 0.34 | NA | 1.3 | 0.9 |
| Flexural strength, MPa (psi) | 655 (95,000) | 655 (95,000) | 680 (98,626) | 670 (97,175) |
| Low Temp. stability | excellent | excellent | excellent | excellent |
| Fracture toughness, MPa $m^{1/2}$ | 10.0 | 10.0 | 9.5 | 9.8 |
| Hardness, $Kg/mm^2$ | 1150 | 1150 | 1150 | 1150 |
| Thermal shock (Hasselmen) | 225 | 225 | 225 | 225 |
| Thermal expansion, ×$10^{-6}$/°C. | 11.0 | 11.0 | 10.8 | 10.8 |
| Elastic Modulus, GPa | 172 | 172 | 172 | 172 |

[1]This composition also contained 0.01% inert materials to bring the percentages to 100.0%

It is understood that the foregoing detailed description is given merely by way of illustration and that many variations may be made therein without departing from the spirit of this invention.

That which is claimed:

1. A stabilized zirconia composition consisting essentially of:

89.15–93.5 mole % $ZrO_2$;

5.5–7.0 mole % $CeO_2$;

1.0–1.5 mole % $Y_2O_3$.

2. The composition according to claim 1 further comprising about 0.01 mole % inert materials and wherein:

said mole % of $ZrO_2$ is about 92.26;

said mole % of $CeO_2$ is about 6.63; and said mole % of $Y_2O_3$ is about 1.1.

3. A stabilized zirconia composition consisting essentially of:

88.4–92.5 mole % $ZrO_2$;

6.0–8.93 mole % $CeO_2$;

1.0–2.0 mole % $Y_2O_3$;

0.3–1.3 mole % $Nd_2O_3$.

4. The composition according to claim 3 wherein:

said mole % of $ZrO_2$ is about 92.01;

said mole % of $CeO_2$ is about 6.65;

said mole % of $Y_2O_3$ is about 1.0; and said mole % of $Nd_2O_3$ is about 0.34.

5. The composition according to claim 3 wherein:

said mole % of $ZrO_2$ is about 90.7;

said mole % of $CeO_2$ is about 6.0;

said mole % of $Y_2O_3$ is about 2.0; and said mole % of $Nd_2O_3$ is about 1.3.

6. The composition according to claim 3 wherein:

said mole % of $ZrO_2$ is 88.37;

said mole % of $CeO_2$ is 8.93;

said mole % of $Y_2O_3$ is 1.80; and said mole % of $Nd_2O_3$ is 0.9.

7. A process for producing a stabilized zirconia composition, comprising the steps of:

providing zirconia wherein said stabilized zirconia composition consists essentially of 89.15–93.5 mole % $ZrO_2$;

providing a zirconia stabilizer consisting essentially of ceria and yttria wherein said stabilized zirconia composition consists essentially of 5.5–7.0 mole % $CeO_2$ and 1.0–1.5 mole % $Y_2O_3$;

mixing said stabilizer with said zirconia; and sintering said zirconia/stabilizer mixture at a temperature of about 1530° C.

8. A process for producing a stabilized zirconia composition, comprising the steps of:

providing zirconia wherein said stabilized zirconia composition consists essentially of 88.4–92.5 mole % $ZrO_2$;

providing a zirconia stabilizer consisting essentially of ceria, yttria and neodymium wherein stabilized zirconia composition consists essentially of 6.0–8.93 mole % $CeO_2$, 1.0–2.0 mole % $Y_2O_3$ and 0.3–1.3 mole % $Nd_2O_3$;

mixing said stabilizer with said zirconia; and sintering said zirconia/stabilizer mixture at a temperature of about 1530° C.

9. The stabilized zirconia according to claim 1 wherein said stabilized zirconia has a flexural strength of about 655 MPa.

10. The stabilized zirconia according to claim 3 wherein said stabilized zirconia has a flexural strength of about 655–680 MPa.

\* \* \* \* \*